June 21, 1938. T. R. HARRISON 2,121,082

INTEGRATOR MECHANISM FOR MEASURING INSTRUMENTS

Filed Jan. 7, 1932 3 Sheets-Sheet 1

INVENTOR.
Thomas R. Harrison
BY John E. Hubbell
ATTORNEYS.

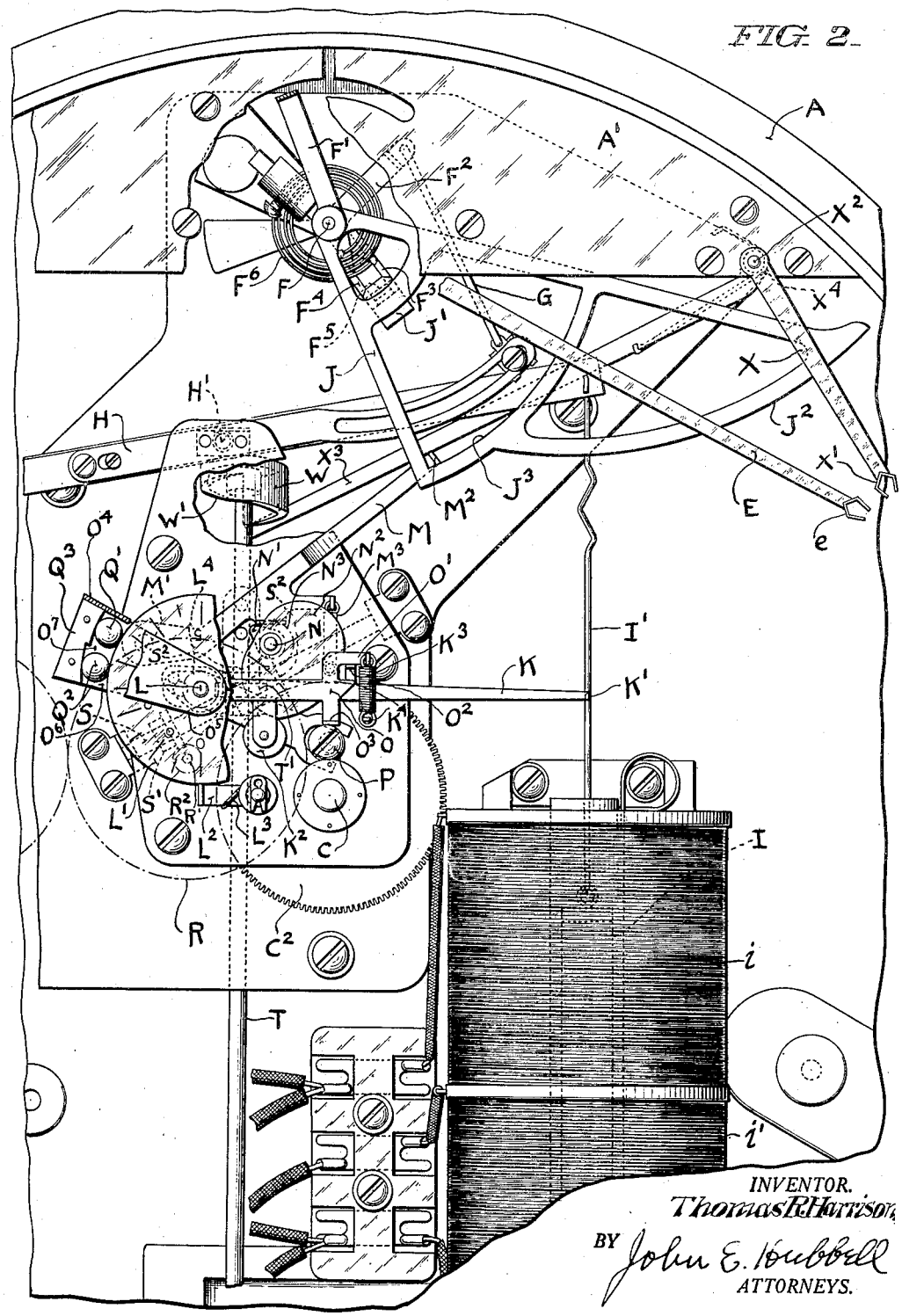

INVENTOR.
Thomas R. Harrison
BY John E. Hubbell
ATTORNEYS.

Patented June 21, 1938

2,121,082

UNITED STATES PATENT OFFICE 2,121,082

INTEGRATOR MECHANISM FOR MEASURING INSTRUMENTS

Thomas R. Harrison, Wyncote, Pa., assignor to The Brown Instrument Company, Philadelphia, Pa., a corporation of Pennsylvania Application January 7, 1932, Serial No. 585,212

13 Claims. (Cl. 235—61)

The general object of my present invention is to provide a meter comprising an element deflecting in accordance with changes in the value of a quantity measured, with improved means through which the varying positions of said element may control the operative effects of power actuated means for integrating the quantity measured. More specifically the object of my present invention is to provide a sensitive recording meter such as a flow meter of known type with a counting train of simple, compact and effective provisions for the periodical actuation of said counting train in accordance with the values of the quantity measured and recorded at the times at which said provisions are actuated.

My invention is characterized in particular by its inherent capacity for integrating mechanism operation at a relatively high speed, so that the time intervals between successive periodic actuations of the integrating mechanism may be desirably short. A decrease in the time interval between each successive pair of counting train actuations contributes directly to increased accuracy in the integration results, and is advantageous also, because it permits small and more numerous increments of increase in value of the integrated quantity to be shown than is possible when said intervals are longer.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Of the drawings:

Fig. 2 is an elevation taken similarly to Fig. 1 but on a larger scale and with parts broken away;

Figure 1:
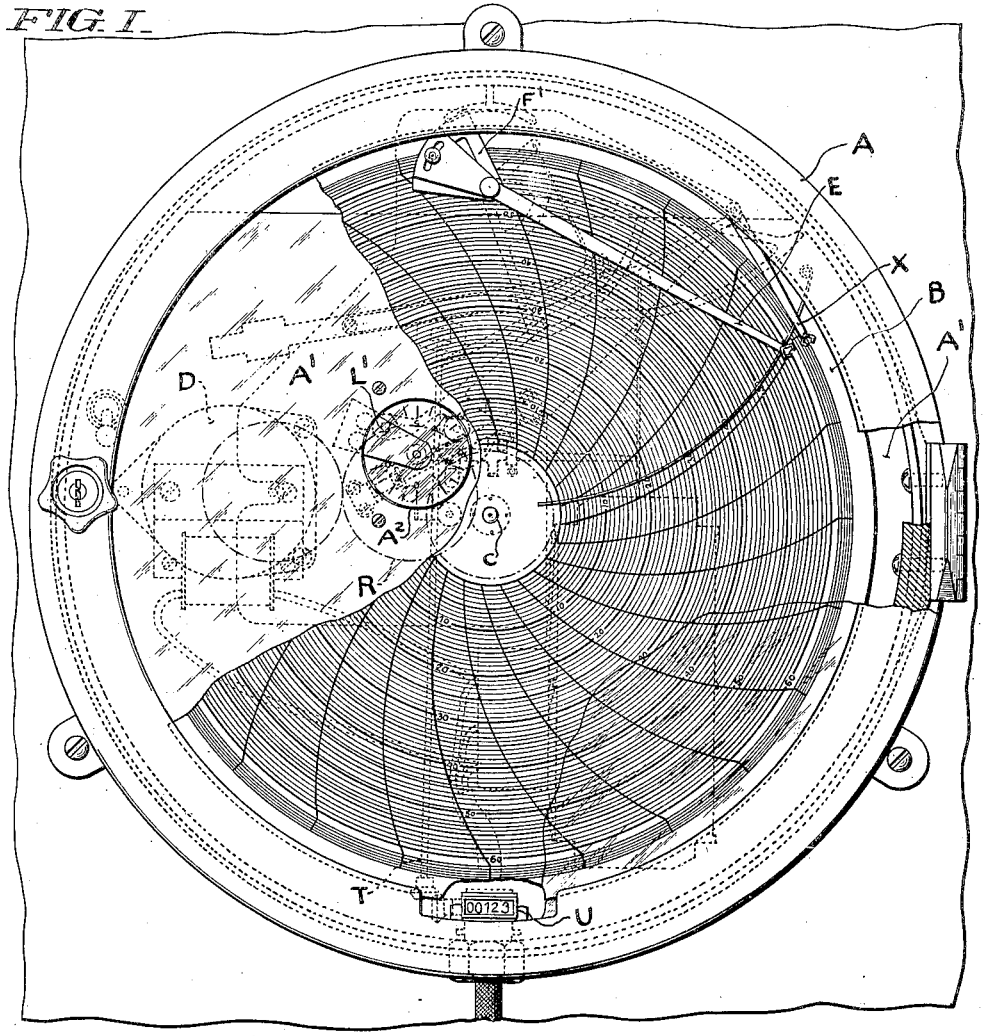
Fig. 1 is a front elevation of the instrument with a portion of the instrument casing broken away and in section.
Figure 3:
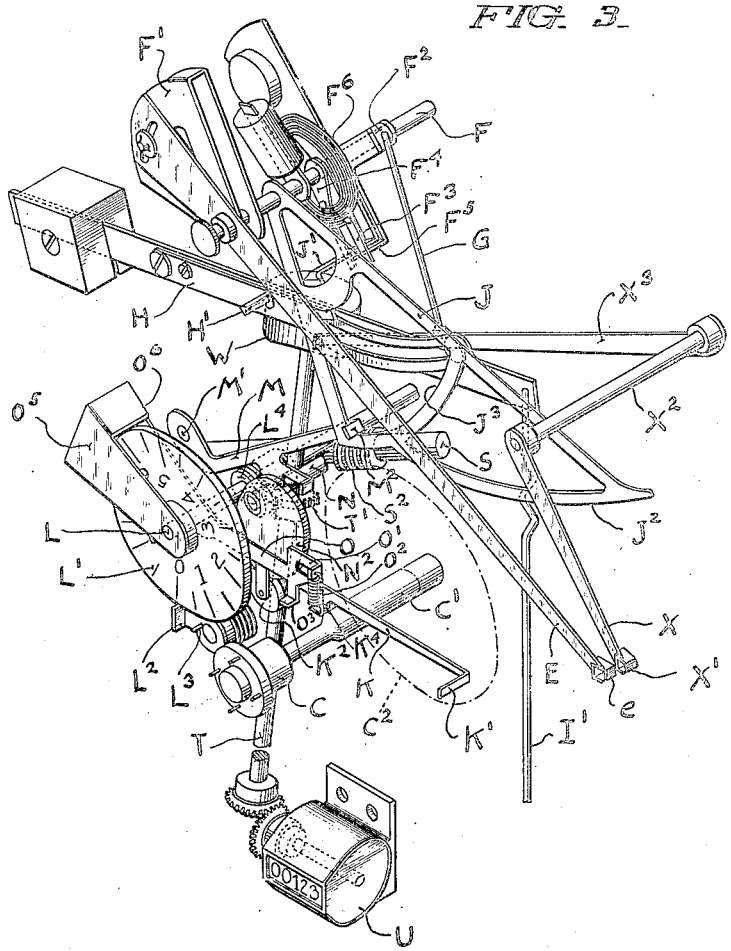
Fig. 3 is a perspective view of a portion of the mechanism of the instrument shown in Fig. 1.

In the drawings, and referring first to Figs. 1, 2 and 3, I have illustrated the use of the present invention in an instrument comprising a circular case A provided with a support A' for a rotating record disc of paper B secured as usual at its center to a record disc driving member C. The member C extends through a central aperture in the surface A' and is carried by a shaft C' which in regular operation is constantly rotated by an electric clock motor D connected to the shaft C' through suitable speed reducing gearing. The electric clock D also drives the hereinafter described integrating mechanism.

As the record disc B is rotated, a record curve is traced thereon by a pen e carried at the end of a pen arm E. The latter is connected to a yoke member F' which extends through a slot in the support A' and back of the latter is secured to a pen shaft F which oscillates in accordance with variations in the quantity measured. As shown the means for oscillating the shaft F comprise an arm $F^2$ secured to the shaft F, a link G connected at one end to the arm $F^2$ and adjustably connected at its opposite end to an operating lever H. The latter is pivotally supported by the instrument framework at H' and is connected to the stem I' of a floating magnet core I, which is thereby suspended from the lever H. The movable system including the pen arm E, core I and their connections is balanced so that the core I has no gravitational tendency to move out of any position into which it may be adjusted. The core I is arranged to move axially relative to two end to end surrounding coils $i$ and $i'$, in response to changes in the relative values of the electric currents flowing through the two coils.

In respect to the above described recording provisions, the instrument shown in Figs. 1, 2 and 3 is identical in substance with those disclosed in my prior Patents Nos. 1,743,853 and 1,743,854, granted January 14, 1930. The combination with such a recording instrument of integrating provisions actuated by the motor for advancing the record disc is also disclosed in each of said prior patents, but in respect to the character of its integrating provisions, the instrument disclosed herein differs in important respects from, and constitutes a substantial improvement over the instruments of said prior patents.

The integrating mechanism disclosed in Figs. 1, 2 and 3 comprises a controlling element J pivotally mounted on the pen shaft F and connected to the latter by a driving connection which normally causes the member J to rotate with the shaft F but yields to permit movement of the shaft F, and thereby of the pen arm E, at times when the member J is temporarily restrained against such movement. Said driving connection includes a part J' connected to the member J and extending between a pair of arms $F^3$ and $F^4$ pivotally mounted on the shaft F, one at each side of an arm $F^5$ secured to the shaft F. A spiral tension spring $F^6$ coiled about the shaft F has one end secured to the arm $F^3$ and its other end secured to the arm $F^4$, and tends to turn each arm toward the other into the position in which they engage the adjacent sides of the arm $F^5$, and at the same time engage the opposite edges of the projection $J'$.

Normally the angular position of the member J corresponds, as does that of the pen arm E, to the current or instantaneous value of the quantity measured. The member J exercises its integrator control function by virtue of the fact that its edge $J^2$ serves as an abutment for a lever K which is pivotally supported by the shaft L. In the normal operation of the instrument when the member J is out of its zero position, the lever K is periodically turned upwardly from an initial position into a second position in which its movement is arrested by the engagement of a lateral projection $K'$ from the member K with the edge $J^2$. On each such up swinging movement the member K starts from a fixed initial position, and the extent of angular movement occurring before it engages the edge $J^2$ depends upon the position of the member J. The edge $J^2$ is so shaped with respect to the distance between the shafts L and F and the distance between the shaft L and projection $K'$, and with respect to the relation between the angular position of the member J and the value of the quantity measured, that the extent of the angular movement of the member K from its initial position into engagement with the edge $J^2$ is in constant linear proportion to the value of the quantity measured. In the unusual condition in which the member J is in its zero position, the edge $J^2$ prevents any operative movement of the lever K away from its initial position toward said edge.

To avoid any tendency to the angular displacement of the member J by the member K when the latter engages the edge $J^2$, a locking member M is pivoted at $M'$ and is provided at its free end with a lateral projection $M^2$ which is permitted to move into engagement with the edge $J^3$ of the member J just prior to each engagement of the edge $J^2$ by the member K. The edge $J^3$ is concentric with the axis of the pen shaft F, and when the lock member M engages the edge $J^3$, the member J is thereby held against turning. While angular movement of the member J is thus prevented by the member M, the spring $F^6$ of the previously described drive connection between the shaft F and member J yields to permit the shaft F to turn in one direction or the other as a result of a change in the value of the quantity measured then occurring. The member M is given a constant tendency to move into engagement with the edge $J^3$ by a spring $M^3$ having its upper end connected to the member M and its lower end connected to the instrument framework. The member M is periodically engaged and moved out of engagement with the edge $J^3$ by a cam $N'$ carried by a shaft N geared to and constantly rotated by the motor D.

The shaft N carries a second cam $N^2$ which controls the movement of the member K into and out of engagement with the edge $J^2$ of the member J. The cam $N^2$ moves the member K into the position shown in full lines in Fig. 2 and holds it in that position during a portion of each revolution by its engagement with a cam follower roll $K^2$ carried by the member K.

The high portion of the cam $N^2$ is concentric with the shaft N and when in engagement with the cam follower $K^2$ prevents the member K from moving from the position shown in full lines in Fig. 2. When its rotation brings a low portion of the cam $N^2$ adjacent the follower $K^2$, the member K is permitted to turn counter-clockwise, as seen in Fig. 2, until the projection $K'$ engages the edge $J^2$ of the member J.

The member K is given a tendency to turn counter-clockwise by its connection to a clutch lever member O which is also pivoted on the shaft L and is so weighted that it tends to turn counter-clockwise whenever permitted to do so by the member K. The connection between the members K and O comprises a projection $K^3$ normally held against the under side of a portion $O'$ of the member O by a tension spring $O^2$ connected at its upper end to said portion $O'$, and at its lower end to a projection $K^4$ from the member K. A shoulder $O^3$ of the member O engages a stationary portion of the instrument frame part, thereby preventing over-movement of the member O on its return or non-working stroke. The frame part engaged by the member O is advantageously formed by an eccentric screw P, the limiting position of which may be adjusted for a purpose hereinafter described.

Figure 5:
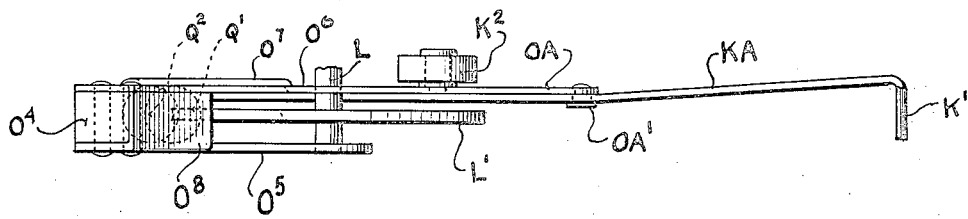
Fig. 5 is a plan view of the mechanism shown in Fig. 4.

A clutch disc $L'$ is secured to the shaft L and on each clockwise movement of the member O the latter is clutched or locked to the disc $L'$ and gives a corresponding clockwise movement to the shaft L. The clutch means for thus locking the clutch lever O to the disc $L'$ is shown as comprising two clutch balls $Q'$ and $Q^2$ held in adjacent ball-ways, one side of each of which is formed by the periphery of the disc $L'$ and the opposing side of which is formed by adjacent curved inner edge portions of a part $Q^3$ secured in a yoke-like portion $O^4$ of the lever O, the front and rear plates $O^5$ and $O^6$, respectively, of said yoke portion lying at opposite sides of the disc $L'$ and forming the remaining walls of the ball-ways. As shown the lever O including its yoke portion is formed by a single piece of sheet metal. Advantageously and as shown the balls are of the same diameter and the ball engaging edge portions of the block $Q^3$ are continuous surfaces so curved as to permit the balls to wedge between them and the periphery of the disc $L'$ while proper clearance between the two balls is provided. The rear wall $O^6$ of the clutch lever is advantageously formed with a rearwardly projecting portion $O^7$ forming a depression in the portion of the rear wall in contact with the balls. This arrangement permits the plate members of the yoke to be sprung apart in assembling the clutch and the balls to be inserted into their proper positions. When the plates return to their normal positions, the balls cannot escape. The disc $L'$, as shown in Fig. 5, is positioned equidistant from the depressed portion of the rear plate and the front plate of the clutch yoke so that it will have a radial contact with the balls. A cover plate $O^8$ substantially closes the upper end of the ballway for the ball $Q'$.

When the lever O is turned counter-clockwise, the balls $Q'$ and $Q^2$ have no positive tendency to clutch the lever O to the disc $L'$, and any frictional tendency of the disc $L'$ to turn in the counter-clockwise direction with the part O is prevented by provisions for engaging and preventing counter-clockwise movement of the disc $L'$. These provisions are advantageously formed in the present instrument by a sliding brake $L^2$ which is held by a spring $L^3$ against the periphery of the disc $L'$. When the clutch lever O is turned in the clockwise direction, however, the balls $Q'$ and $Q^2$ wedge in the lower ends of their ball-ways between the block $Q^3$ and the periphery of the disc $L'$ and thereby positively clutch or lock the lever O to the disc $L'$ so that the latter shares in the clockwise turning movement of the member O.

The shaft N is continuously rotated by the motor D at a suitable constant speed by a gear connection shown as comprising an intermediate gear R in mesh with a gear $N^3$ secured to the shaft N. The supporting shaft $R'$ of the gear R carries a worm $R^2$ in mesh with a worm wheel $S'$ carried by a countershaft S. The latter carries a gear $S^2$ in mesh with a large gear wheel $C^2$ carried by the shaft $C'$. The shaft $C'$ is thus rotated at a speed proportional to, but substantially lower than the speed of the shaft N.

The aggregate clockwise movement imparted through the disc $L'$ to the shaft L during a given period, corresponds to the integrated value of the quantity measured during the same period. The disc $L'$ is shown as provided with scale marks through which its rotative movements may be observed through an aperture $A^2$ in the support $A'$ when not obscured by the record disc B. This is a convenience for calibration purposes, but in the regular use of the instrument the record disc is in front of the disc $L'$ so that the scale marks on the latter are obscured.

The shaft L carries a worm $L^4$ in mesh with a gear wheel $T'$ carried by a shaft T. The latter is connected at its lower end to, and operates a counting train U which registers the revolutions of the shaft T and thereby registers the integrated value of the quantity measured.

Advantageously and as shown the shaft T carries a cam W at its upper end having a helical cam edge $W'$ which gives movements to a tally record pen $X'$ carried by a pen arm X. The latter is secured to a supporting shaft $X^2$ which is pivotally mounted in the instrument framework and has a second arm $X^3$ which is held by a spring $X^4$ against the cam edge $W'$. The pen $X'$ makes a tally record on the marginal portion of the record disc, similar to that made by a somewhat different tally record mechanism disclosed in my said prior Patent No. 1,743,854.

The idea of using a power actuated clutch or ratchet lever to periodically advance the driving element of a counting train in accordance with the instantaneous value of a quantity measured is not novel. The mechanisms heretofore so used or proposed for such use, however, have either been of a character not suitable for use in conjunction with the recording and measuring features of a sensitive recording instrument of the character herein disclosed, or have been characterized by a complication of parts, or by an inherent inaccuracy due either to their lack of capacity for operation at a desirably high speed or to other causes which are avoided or substantially minimized with the present invention.

With the present invention the speed of the cam shaft N, which determines the frequency of integrator actuation may well be ten or more revolutions per minute. This provides a frequency of integrator actuation greater than is practically possible in somewhat similar instruments including measuring and recording provisions of similar sensitivity, and several times as great as that of any such instrument in actual use of which I have knowledge. When proper account is taken of the practical limitations imposed by the conditions of use of a sensitive measuring instrument, it will be recognized by those skilled in the art that the present invention is characterized by its mechanical simplicity, effectiveness and compactness.

The clutch mechanism through which oscillations of the member K give angular movements to the shaft L and thereby to the shaft T and the counting train is positive and reliable in its operation, and its operative reliability is enhanced by the fact that dirt accumulation on the clutch contacting surfaces which otherwise might result in some slippage, is avoided by the wiping or rubbing action of the brake arm $L^2$. The latter continuously cleans the peripheral edge of the disc $L'$, and the latter has a cleaning action on the contacting surfaces of the clutch balls $Q'$ and $Q^2$. Dirt transferred from the surface of the clutch balls to an adjacent portion of the edge of the disc $L'$ is removed from the latter by the arm $L^2$, before that portion of the disc again comes into contact with the clutch balls. The clutch is advantageously so constructed and disposed in the instrument casing that any dirt or other material separated from the balls $Q'$ or $Q^2$ or the disc will fall through the open lower side of the clutch or from the member $L^2$ into a portion of the casing unoccupied by other parts of the mechanism and from where it can be easily removed.

The use of the cams $N'$ and $N^2$ on the same shaft N for separately operating the lock member M and clutch member O, respectively, makes it possible to properly and positively time the operation of those members and also facilitates the desirably simple and compact disposition of the parts illustrated. As previously pointed out, over down movement of the clutch lever O is prevented by the engagement of the shoulder $O^3$ with the stationary stop formed by the head of the screw P. By making the throw of the cam $N^2$ such that the down stroke of the member K is slightly greater than that required to move the shoulder $O^3$ against the screw P, inaccuracies which might otherwise result from wear of the cam and the surface of the lever K engaged by the cam are prevented. Such down movement of the lever K in excess of that required to complete the down stroke of the lever O is permitted by the yielding connection including the spring $O^2$ between the levers O and K. That yielding connection also cushions the impact of the lever K against the cam edge $J^2$, and reduces the shock put on the motor and the maximum driving motor torque required in starting the counting train and its driving mechanism into motion at the beginning of each counting train advance movement.

The down movement of the lever K must be such that it will be brought low enough to clear the member J, even when the latter is in its zero position. This necessitates a movement of the lever K lower than would be otherwise necessary. If the lever K were directly connected to the lever O this additional movement for clearance would cause a corresponding movement of the disc $L'$ and thereby a slight error in the integrated value, which would soon become appreciable. However, because of its yielding connection with the lever O and the adjustability of the stop member P the lever K may have the necessary travel for proper clearance without a corresponding error in the integrated value. The screw P is adjusted to halt the lever O at a lower limit corresponding to the point at which the clutch actuating action of the lever K should properly end. The amount of additional movement of the latter for clearing the member J will then be immaterial.

Figure 4:
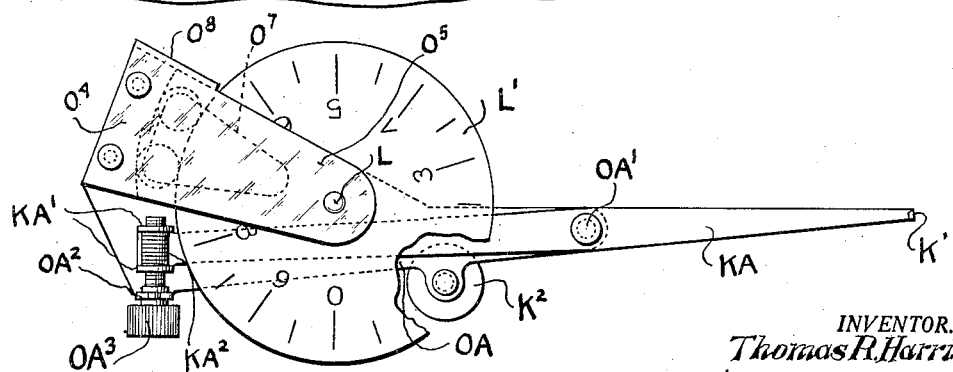
Fig. 4 is an elevation of a modified form of integrator actuating means.

In the modified clutch mechanism illustrated in Figs. 4 and 5, the yielding connection between the levers is replaced by a positive connection. Sufficient movement is provided for the lever KA, corresponding in function to the lever K of Figs. 1–3, to clear the member J when the latter is in its zero position. In the modified construction, an intermediate portion of the lever KA is pivoted on a stud OA' carried on the end of the clutch lever OA. The rear plate of the yoke section of the lever OA is extended downwardly and provided with a forwardly projecting lug OA$^2$ in which is swiveled an adjusting screw OA$^3$. The adjacent end of the lever KA is formed with a pair of spaced eyelets KA' between which a closely wound helical spring KA$^2$ is arranged. The latter forms a nut for the threaded end of the adjusting screw OA$^3$. The cam roller K$^2$ may be carried by either the lever KA, or as shown, the lever OA. In calibrating the instrument, the member J is moved to its zero position and the highest point of the cam N$^2$ arranged adjacent the cam roller K$^2$. The screw OA$^3$ is then adjusted until the necessary clearance between the lever KA and member J is reduced to a minimum. In practice this will be so small as to have only a negligible effect on the disc L'.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention what I claim as new and desire to secure by Letters Patent, is:

1. In a meter having a member deflectable in accordance with changes in the instantaneous value of the quantity measured, a counting train and actuating means therefor including a shaft, a lever arranged to turn back and forth between an initial position and a second position in which it engages said member and which varies with the deflection of the latter, said lever being biased to move from said initial position into said second position, means including clutch parts and a yielding connection connecting said shaft to the lever yieldable on movement of the latter towards said initial position, and power operating means for periodically engaging and moving said lever out of engagement with said member and back into said initial position and thereafter receding from said lever to permit the free movement of the latter into said second position as a result of said tendency.

2. In a meter having a deflectable member, a counting train and actuating means therefor including a shaft, a stop, a lever arranged to turn back and forth between an initial position in which it engages said stop and a second position in which it engages said member and which varies with the deflection of the latter, said stop being angularly adjustable to vary said initial position, said lever being biased to move from said initial position into said second position, clutch parts connecting said shaft to the lever on movement of the latter toward said initial position while permitting movement of the lever in the opposite direction without corresponding movement of the shaft, and a rotating cam periodically engaging said lever and returning the latter to said initial position.

3. In a meter having a deflectable member, a counting train and actuating means therefor including a shaft, a lever movable towards and away from a position of engagement with said member varying with the deflection of the latter, a clutch lever pivotally supported on said shaft, lever connecting means normally tending to move the clutch lever with the first mentioned lever but including a part yielding to permit some movement of the first-mentioned lever away from said position without corresponding movement in the same direction of the clutch lever, clutch parts connecting said clutch lever to said shaft on movement of the levers away from said position, means for arresting the movement of the clutch lever in said direction, and means periodically giving the first mentioned lever sufficient movement away from said position to bring the clutch lever into engagement with said arresting means.

4. In a meter having a deflectable member, a counting train, and means for actuating said counting train in accordance with the extent of movement of said deflectable member including a shaft operatively connected to said counting train, a lever periodically movable towards and away from a position in which it engages said deflectable member and which varies with the movement of the latter, a clutch lever pivotally supported on said shaft and movable with said first mentioned lever towards and away from said engaging position, clutch provisions connecting said clutch lever to said shaft on movement of said levers away from said engaging position, and means for arresting the last-mentioned movement of said clutch lever when the latter reaches a predetermined position, said arresting means being adjustable to vary the location of said last mentioned position.

5. In a meter having a deflectable member, a counting train and actuating means therefor including a shaft, a lever supported on said shaft and moving periodically back and forth between an initial position and a second position in which it engages said member and which varies with the deflection of the latter, a clutch lever journalled on said shaft, a connection between said levers normally holding them against relative movement but adjustable to vary the relative positions of the levers when the first mentioned lever is in said initial position, and clutch parts connecting said shaft to said clutch lever on movement of the latter with the first mentioned lever toward said initial position while permitting movement of the clutch lever in the opposite direction without corresponding movement of the shaft.

6. In a meter having a deflectable member, a counting train, and means for actuating said counting train in accordance with the extent of movement of said deflectable member including a shaft operatively connected to said counting train, a lever periodically movable from an initial position towards and away from a position in which it engages said deflectable member and which varies with the movement of the latter, said lever when in said initial position being arranged to have clearance relative to said deflectable member when the latter is in its zero position, means including clutch parts connecting said lever to said shaft on movement of said lever away from said engaging position, and means for arresting the action of said clutch parts when said lever reaches a position during its movement in said direction at which it would engage said deflectable member when the latter is in its zero position.

7. In a meter having a deflectable member, a counting train, and means for actuating said counting train in accordance with the extent of movement of said deflectable member including a shaft operatively connected to said counting train, a lever periodically movable from an initial position towards and away from a position in which it engages said deflectable member and which varies with the movement of the latter, said lever when in said initial position being arranged to have clearance relative to said deflectable member when the latter is in its zero position, means including clutch parts connecting said lever to said shaft on movement of said lever away from said engaging position, means for arresting the action of said clutch parts when said lever reaches a position during its movement in said direction at which it would engage said deflectable member when the latter is in its zero position, and means for varying the amount of said clearance between said lever and deflectable member.

8. In a meter having a deflectable member, a counting train, and means for actuating said counting train in accordance with the extent of movement of said deflectable member including a shaft operatively connected to said counting train, a lever periodically movable towards and away from a position in which it engages said deflectable member and which varies with the movement of the latter, a clutch lever pivotally supported on said shaft and having an adjustable connection with said first mentioned lever, means including clutch parts connecting said clutch lever to said shaft on movement of said levers away from said engaging position, means for arresting the movement of said clutch lever in said direction at a predetermined point, and means for relatively positioning said levers to vary the limit of movement of said lever away from its engaging position.

9. In a meter having a deflectable member, a counting train and actuating means therefor including a horizontal shaft, a lever pivotally supported on said shaft to turn back and forth between an initial position and a second position in which it engages said member and which varies with the deflection of the latter, said lever having a tendency to move from said initial position into said second position, clutch parts connecting said shaft to the lever on movement of the latter toward said initial position while permitting movement of the lever in the opposite direction without corresponding movement of the shaft, a rotating cam periodically engaging said lever and returning the latter to said initial position and thereafter receding from said lever to permit the free movement of the latter into said second position as a result of said tendency, and means separate from said cam for arresting the movement of said lever away from said second position.

10. In a meter having a member deflectable in accordance with changes in the instantaneous value of the quantity measured, a counting train and actuating means therefor including a shaft, a lever arranged to turn back and forth through an intermediate zero position between an initial position and a second position in which it engages said member and which varies with the deflection of the latter, said lever being biased to move from said initial position into said second position, means including clutch parts connecting said shaft to the lever on movement of the latter toward said initial position from said second position, means preventing movement of said shaft by said lever during movement of the latter from said zero position toward said initial position, and means for periodically moving said lever from said second position into said initial position.

11. In a meter having a member deflectable in accordance with changes in the instantaneous value of the quantity measured, a feeler arranged to move back and forth through an intermediate zero position between an initial position and a second position in which it engages said member and which varies with the deflection of the latter, said feeler being biased to move from said initial position into said second position, power operating means for periodically moving said feeler out of engagement with said member and back into said initial position, means actuated by said feeler on movement of the latter toward said zero position from said second position, and means preventing actuation of the last previously mentioned means during movement of said feeler from said zero position toward said initial position.

12. In a meter having a deflectable member, a counting train and actuating means therefor including a shaft, a stop, a lever arranged to turn back and forth between an initial position in which it engages said stop and a second position controlled by said member and which varies with the deflection of the latter, said stop being adjustable to vary said initial position, said lever being biased to move from said initial position into said second position, clutch parts connecting said shaft to the lever on movement of the latter between said positions in one direction while permitting movement of the lever in the opposite direction without corresponding movement of the shaft, and a rotating cam periodically engaging said lever and returning the latter to said initial position.

13. In a meter having a deflectable member, a counting train and actuating means therefor including a horizontal shaft, a lever pivotally supported on said shaft to turn back and forth between an initial position and a second position in which it engages said member and which varies with the deflection of the latter, said lever having a tendency to move from said initial position into said second position, clutch parts connecting said shaft to the lever on movement of the latter toward said initial position while permitting movement of the lever in the opposite direction without corresponding movement of the shaft, a rotating cam periodically engaging said lever and returning the latter to said initial position, and adjustable means separate from said cam for arresting the movement of said lever away from said second position.

THOMAS R. HARRISON.